United States Patent Office 2,782,234
Patented Feb. 19, 1957

2,782,234

N-ALKYL-N-(DIALKYLAMINOALKOXYALKYL) BENZHYDRYLAMINES AND SALTS THEREOF

Kurt J. Rorig, Evanston, Ill., assignor, by mesne assignments, to G. D. Searle & Co., Skokie, Ill., a corporation of Delaware No Drawing. Application August 13, 1954, Serial No. 449,787

7 Claims. (Cl. 260—570)

My present invention relates to a new group of organic compounds containing two tertiary amino groups and one ether group and, more particularly, to N-alkyl-N-(dialkylaminoalkoxyalkyl)benzhydrylamines, their salts and the production thereof.

The compounds which constitute my invention can be represented by the general basic structural formula

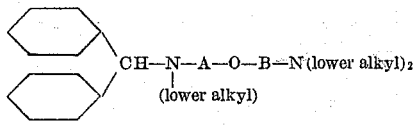

wherein A and B are lower alkylene radicals such as ethylene, propylene, butylene, amylene, or polymethylene radicals such as trimethylene, tetramethylene, pentamethylene, hexamethylene and the like. The lower alkyl radicals in the foregoing structural formula can be methyl, ethyl, straight-chained and branched propyl, butyl, amyl, and hexyl.

The bases described herein form salts which are non-toxic in therapeutic dosage with a variety of inorganic and strong organic acids such as phosphoric, hydrochloric, hydrobromic, hydriodic, sulfamic, acetic, maleic, malic, succinic, tartaric, citric, ascorbic, gluconic, benzoic, cinnamic and related acids. They also form quaternary ammonium salts with a variety of organic esters of sulfuric, hydrohalic, and aromatic sulfonic acids. Among such esters are methyl chloride, bromide and iodide; the ethyl halides, propyl halides, butyl halides, isobutyl halides, benzyl halides, phenethyl halides, naphthylmethyl halides, dimethyl sulfate, methyl benzensulfonate, ethyl toluenesulfonate, ethylene chlorohydrin, ethylene bromohydrin, the propylene halohydrins, allyl chloride, methallyl bromide, and crotyl bromide.

The compounds of my invention are valuable as intermediates in organic synthesis. They are active medicinal agents showing a number of valuable pharmacological properties. The tertiary bases and their acid addition salts have a potent papaverine-like action and are valuable because of their specific musculotropic spasmolytic action. The quaternary ammonium salts of the type described above are active ganglion blocking agents. The compounds of my invention are also valuable as cardiovascular drugs.

My invention will be illustrated in further detail by the following examples. However, these examples are not to be construed as limiting it in spirit or in scope. In these examples, quantities of materials are given in parts by weight, and pressures in millimeters (mm.) of mercury.

Example 1

A mixture of 741 parts of diphenylbromomethane, 450 parts of N-methyl-β-hydroxyethylamine, 1600 parts of butanone, and 5 parts of sodium iodide is stirred for 2 hours and then concentrated under vacuum on a steam bath. The residue is rendered alkaline by addition of aqueous potassium carbonate and extracted with ether. This extract is washed with water, dried over anhydrous calcium sulfate, filtered and evaporated. The residue is distilled at 0.5 mm. pressure and 142–143° C. to yield N-(β-hydroxyethyl)-N-methylbenzhydrylamine.

A mixture of 48 parts of this distillate, 6 parts of sodium hydride and 2700 parts of xylene is refluxed for 26 hours and then treated with a solution of 22 parts of β-chloroethyldimethylamine in 25 parts of xylene. Refluxing is continued for 22 hours after which the solution is filtered and the filtrate is extracted with dilute hydrochloric acid. The extract is rendered alkaline by addition of dilute sodium hydroxide and extracted with ether. This ether solution is dried over anhydrous potassium carbonate, filtered and evaporated. The residue is distilled at 0.2 mm. pressure and 141–148° C. to yield N-(dimethylaminoethoxyethyl) - N - methylbenzhydrylamine which has the structural formula

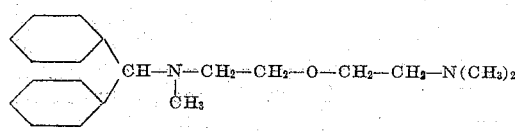

Example 2

A mixture of 156 parts of N-(dimethylaminoethoxyethyl)-N-methylbenzhydrylamine and a solution of 4 parts of hydrogen chloride in 32 parts of isopropanol is treated with 300 parts of absolute ether and permitted to stand at 0° C. for 3 days. The resulting precipitate is collected on a filter and recrystallized from a mixture of ethanol and ether. The dihydrochloride of N-(dimethylaminoethoxyethyl) - N - methylbenzhydrylamine thus obtained melts at about 158–160° C.

Example 3

A mixture of 15.6 parts of N-(dimethylaminoethoxyethyl)N-methylbenzhydrylamine, 100 parts of butanone and 2.5 parts of chloromethane is maintained at 25° C. for 4 days after which the crystalline precipitate is collected on a filter and recrystallized from a mixture of chloroform and ethyl acetate. The methochloride of N - (dimethylaminoethoxyethyl) - N - methylbenzhydrylamine thus obtained melts at about 79–81° C.

Example 4

A mixture of 48 parts of N-(β-hydroxyethyl)-N-methylbenzhydrylamine, 6 parts of sodium hydride and 250 parts of xylene is refluxed for 28 hours and then treated with 28 parts of β-chloroethyldiethylamine. After refluxing for 22 hours the reaction mixture is filtered and the filtrate is treated with dilute hydrochloric acid. The aqueous layer is separated, rendered slightly alkaline by addition of potassium carbonate, and extracted with ether. This extract is dried over anhydrous potassium carbonate, filtered and evaporated to yield N-(diethylaminoethoxyethyl) - N - methylbenzhydrylamine which is distilled at about 156–157° C. and 0.2 mm. pressure. The compound has the structural formula

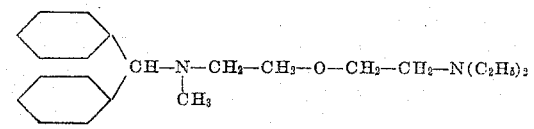

Example 5

A solution of 4 parts of anhydrous hydrogen chloride in 32 parts of isopropanol is added to 17 parts of N-(diethylaminoethoxyethyl) - N - methylbenzhydrylamine. Upon further addition of 300 parts of absolute ether and storage at 0° C. for several days, the crystalline dihydrochloride is obtained. Recrystallized from a mixture of ethanol and ether, this salt melts at about 142–144° C.

Example 6

A mixture of 494 parts of diphenylbromomethane, 356 parts of N-ethyl-β-hydroxyethylamine and 1000 parts of butanone is stirred for 4 hours, filtered and concentrated on a steam bath. The residue is made alkaline by addition of potassium carbonate and extracted with ether. The ether solution is dried over anhydrous potassium carbonate, filtered and evaporated to yield N-(β-hydroxyethyl)-N-ethylbenzhydrylamine which is distilled at about 157–165° C. and 0.7 mm. pressure.

A mixture of 508 parts of the N-(β-hydroxyethyl-N-ethylbenzhydrylamine thus obtained, 60 parts of sodium hydride and 3000 parts of xylene is refluxed for 26 hours after which 329 parts of β-chloroethyldiisopropylamine are added and refluxing is continued for another day. The reaction mixture is filtered and the filtrate is extracted with dilute aqueous hydrochloric acid. The extract is washed with ether, rendered alkaline by addition of dilute potassium carbonate, and extracted with ether. This ether solution is dried over anhydrous potassium carbonate, filtered and evaporated and the residue is distilled at about 0.25–0.3 mm. pressure. N-(diisopropylaminoethoxyethyl)-N-ethylbenzhydrylamine is collected at 175–185° C. The compound has the structural formula

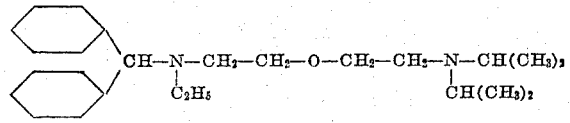

Example 7

In the course of 2 hours a solution of 50 parts of diphenylbromomethane in 20 parts of toluene is added portionwise to a refluxing solution of 52 parts of N-n-butyl-γ-hydroxypropylamine in 20 parts of toluene. Refluxing is continued for 4 hours, after which the reaction mixture is chilled and the resulting precipitate is washed on a filter with ether. The combined filtrates are dried over anhydrous potassium carbonate, filtered and evaporated to yield N-(γ-hydroxypropl)-N-n-butylbenzhydrylamine.

A mixture of 30 parts of this product, 3 parts of sodium hydride and 150 parts of xylene is refluxed for a day, treated with 11.5 parts of γ-chloropropyldimethylamine and then refluxed for an additional day. After cooling the precipitate is removed by filtration and the filtrate is treated with dilute hydrochloric acid. The aqueous layer is separated, washed with ether, rendered alkaline by addition of dilute sodium hydroxide and extracted with ether. This extract is washed with water, dried over anhydrous potassium carbonate, filtered and evaporated to yield N-(dimethylaminopropoxypropyl)-N-n-butylbenzhydrylamine which is distilled at 190–200° C. and 0.2–0.25 mm. pressure. The compound has the structural formula

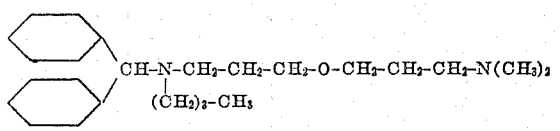

I claim:

1. A compound of the structural formula

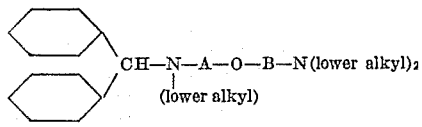

wherein A and B are lower alkylene radicals.

2. A compound of the structural formula

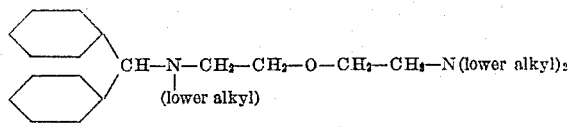

3. A compound of the structural formula

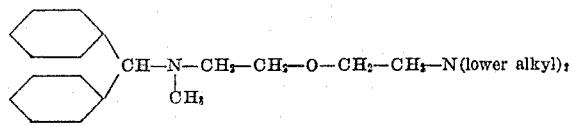

4.

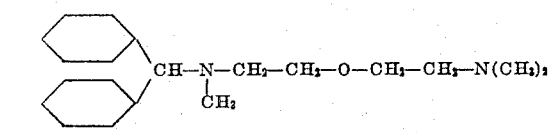

5.

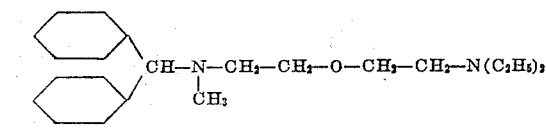

6.

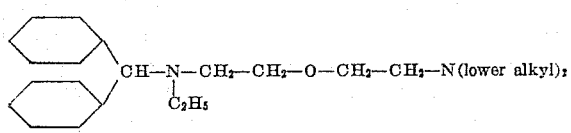

7.

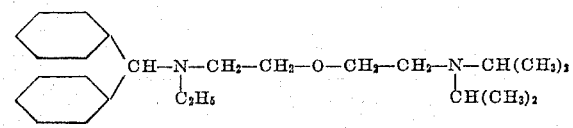

References Cited in the file of this patent
FOREIGN PATENTS 130,423    Sweden _____ Jan. 2, 1951